US005899444A

United States Patent [19]

Rempe

[11] Patent Number: 5,899,444

[45] Date of Patent: May 4, 1999

[54] HAND-HELD CUTTING BOARD

[76] Inventor: Tami M. Rempe, 15691 S. Downing Ct., Olathe, Kans. 66062

[21] Appl. No.: 08/861,037

[22] Filed: May 21, 1997

[51] Int. Cl.$^{6}$ .......... B23Q 3/00

[52] U.S. Cl. .......... 269/3; 269/289 R

[58] Field of Search .......... 2/16, 20, 161.6; 441/57, 58, 56; 83/762, 761; 269/289 R, 302.1, 87.2, 3

[56] References Cited

U.S. PATENT DOCUMENTS

| | | | |
|---|---|---|---|
| 2,109,429 | 2/1938 | Malm | 441/58 |
| 2,227,825 | 1/1941 | Devermann | 441/58 |
| 2,569,200 | 9/1951 | Smith | 441/58 |
| 2,652,087 | 9/1953 | Turpin | 83/762 |
| 2,745,119 | 5/1956 | Whipple | 441/58 |
| 2,941,218 | 6/1960 | Read | 441/58 |
| 3,039,120 | 6/1962 | Powell et al. | 441/58 |
| 3,258,794 | 7/1966 | Goodwin eta l. | 441/58 |
| 3,397,414 | 8/1968 | Webb | 441/58 |
| 4,493,663 | 1/1985 | Richmond | 441/56 |
| 4,546,686 | 10/1985 | Losiowski et al. . | |
| 4,685,667 | 8/1987 | McDonald | 441/58 |
| 4,747,331 | 5/1988 | Policella . | |
| 4,807,505 | 2/1989 | Campbell et al. . | |
| 5,228,668 | 7/1993 | Guyer . | |
| 5,361,666 | 11/1994 | Kensrue . | |
| 5,431,078 | 7/1995 | Ricard et al. . | |
| 5,481,953 | 1/1996 | McLeod . | |
| 5,501,441 | 3/1996 | Kegley | 269/289 R |
| 5,715,736 | 2/1998 | Cherney | 269/3 |

*Primary Examiner*—Robert C. Watson

[57] ABSTRACT

The present invention is a hand-held cutting board to be used when slicing bagels or other small food articles. This invention is made up of a circular base having a thumb hole and a finger slot cut out of the base. The thumb hole and finger slot are placed over the thumb and fingers of the receiving hand of the user, so that the circular base comes to rest at the bottom of the thumb and fingers. The thumb and fingers are able to move freely in order to pick up a bagel or the like to be sliced. Pressure is applied by the thumb and fingers so that the bagel is held securely in place above the circular base. The opposite hand using a knife slices through the bagel down to the circular base, which protects the receiving hand of the user from the sharp knife.

3 Claims, 2 Drawing Sheets

HAND-HELD CUTTING BOARD

BACKGROUND—FIELD OF INVENTION

This invention relates generally to cutting boards, specifically to devices used for slicing bagels and other small food articles.

BACKGROUND—DISCUSSION OF PRIOR ART

The recent rise in popularity of the bagel has spawned an increase in emergency room visits by people who were attempting to slice a bagel in half while holding it in one hand and slicing it with a knife with the other hand. Too often, the knife would cut through the bagel and into fingers and palms as well. In an attempt to solve this growing problem, a number of machines and devices for slicing bagels have been invented. See, for example, U.S. Pat. Nos. 4,546,686; 4,747,331; 4,807,505; 5,228,668; 5,361,666; 5,431,078; and 5,481,953. These generally comprise holding jigs or receptacles into which the bagel is placed to hold it during a conventional knife-cutting operation. Some of these receptacles have hinged or movable walls, allowing for inserting a bagel and applying pressure to hold it in place. See, for example, aforementioned U.S. Pat. Nos. 4,807,505 and 5,481,953. Others, such as U.S. Pat. Nos. 5,431,078 and 4,747,331 include a blade and therefore make a knife unnecessary. There are noticeable disadvantages to the prior art. One is that most of the holding receptacles are formed in the basic shape of a bagel, and therefore limit their function strictly to slicing bagels. Also, many of them have complex mechanisms or moving parts which make them relatively expensive to manufacture, one example of which is U.S. Pat. No. 5,361,666. These complex machines are more likely to break down with frequent use, and are also difficult to clean when food particles get stuck between parts. Most of the prior art devices, including conventional cutting boards, require a countertop for proper use, and some are too large to be stored in a drawer or cabinet. Even with all of the prior art available, hundreds of people are still winding up in the ER, because they know that it is faster, easier, and more convenient to slice a bagel while holding it in their hand.

OBJECTS AND ADVANTAGES

Accordingly, it is a primary object of the present invention to provide a hand-held cutting board which will protect a person's hand while holding a bagel and slicing it with a knife.

Another object of the present invention is to provide a hand-held cutting board to be used when slicing bagels or other small food articles (i.e. hand-held fruits).

Another object of the present invention is to provide a hand-held cutting board to use when slicing bagels or the like which does not require a counter-top or other flat surface to rest upon while in operation.

Another object of the present invention is to provide a hand-held cutting board which has no intricate fixed or moving parts, thereby making it relatively inexpensive to manufacture and virtually maintenance-free to operate.

Another object of the present invention is to provide a hand-held cutting board which is ergonomically designed to slice bagels or the like safely and efficiently.

Other objects and advantages of the present invention are to provide a hand-held cutting board to use when slicing bagels or the like which: is small enough to be stored in a drawer: is constructed of a sturdy one-piece design that is easy to clean and able to withstand frequent use; allows the user to pick up the food article, slice it, put it down and pick up another quickly and easily while their hand is constantly protected; and which, with proper use, will prevent hands and fingers from being accidentally cut by the knife. Still further objects and advantages of the present invention will become apparent from a consideration of the drawings and ensuing description.

Figure 1:
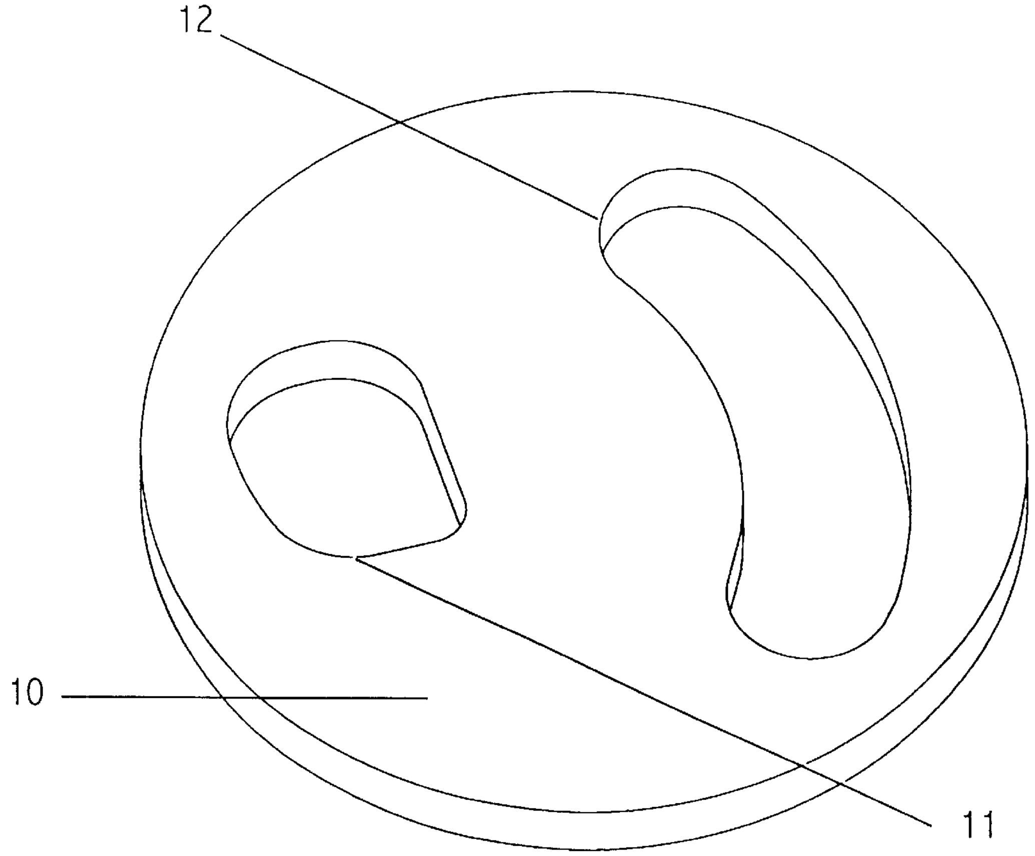
FIG. 1 is a perspective view of the hand-held cutting board.

| List of Reference Numerals | |
|---|---|
| 10 | circular base |
| 11 | thumb hole |
| 12 | finger slot |
| 13 | receiving hand |

SUMMARY

The present invention is a hand-held cutting board which allows the person using it to slice bagels and other food articles while holding the food in one hand and cutting it using a knife with the other hand. The base of the hand-held cutting board has a thumb hole and a finger slot and is placed over the thumb and fingers of the receiving hand. The thumb and fingers remain unrestrained to move and pick up the bagel or the like which is to be sliced. The thumb and fingers of the receiving hand apply adequate pressure on the bagel to hold it securely in place without damaging it, while the opposite hand utilizes a knife in a back-and-forth manner to slice through the bagel. The knife is allowed to cut completely through the bagel down to the base of the hand-held cutting board, which protects the user's palm from the sharp blade of the knife.

DESCRIPTION OF THE INVENTION

Referring to FIG. 1, the hand-held cutting board, shown in perspective view for use with a left hand, comprises a circular base 10, having a thumb hole 11 and a finger slot 12. Circular base 10 is preferably made of an attractive and sturdy material (one example of which is oak), having a diameter of about 5 inches and a thickness of ⅜ inch. Thumb hole 11 is an elliptical shape with dimensions of approximately 1⅛ inches×1½ inches, while finger slot 12 is a kidney shape having a width of nearly 1⅛ inches at its midpoint and ¾ inch at both endpoints, the length of finger slot 12 being about 3½ inches. Thumb hole 11 is positioned slightly above center in the left half of circular base 10. Finger slot 12 is centrally located on the right half of circular base 10, such that a distance of about 1½ inches separates the two openings. Thumb hole 11 and finger slot 12 should be at least ½ inch away from the outer edge of circular base 10. All edges are preferably rounded and smoothed to provide maximum comfort to the user.

OPERATION OF THE INVENTION

Figure 2:
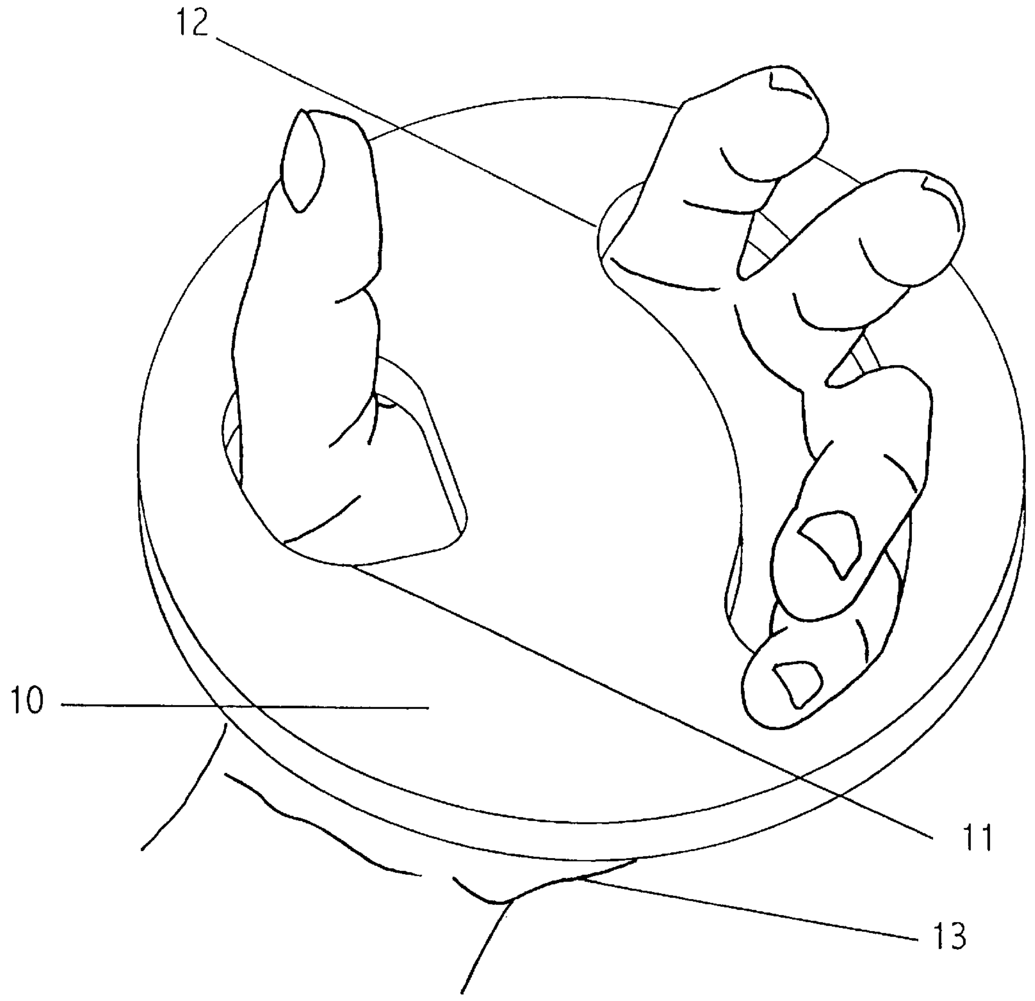
FIG. 2 is a perspective view showing the hand-held cutting board being held by a left hand in preparation for use.

FIG. 2 shows a perspective view of the hand-held cutting board in readiness for use. Thumb hole 11 and finger slot 12 are placed over the thumb and fingers of a receiving hand 13 (in this case a left hand), so that circular base 10 comes to rest at the bottom of the thumb and fingers. Receiving hand 13 is poised to pick up a bagel or other food article (not shown) which is then held securely between the thumb and fingers on top of circular base 10 in order to be sliced in half by a knife (not shown).

CONCLUSIONS, RAMIFICATIONS, AND SCOPE OF THE INVENTION

Thus the reader will see that the circular base of the invention is made of a rigid, lightweight material that protects the user's hand while holding and slicing bagels or other small food articles. The thumb hole and finger slot are of such a size and shape as to accommodate hands of many different sizes. Additionally, the circular base can be flipped over and used to protect the receiving hand of both right- and left-handed people.

While the above description contains many specificities, these should not be construed as limitations on the scope of the invention, but rather as an exemplification of one preferred embodiment thereof. Many other variations are possible. For example, the shape of the base could be rectangular or triangular instead of circular. Also, the base need not be constructed from a hardwood, but could be made from a molded plastic or acrylic instead. The shape and size of the thumb hole could be altered somewhat. Also, the kidney-shaped finger slot could be replaced with four small finger holes.

It should be understood by those skilled in the art that obvious structural modifications can be made without departing from the spirit of the invention. Accordingly, reference should be made primarily to the accompanying claims, rather than the foregoing specification, to determine the scope of the invention.

I claim:

1. A hand-held device to use when slicing bagels or other small food articles, comprising:

a. a base made of a rigid, lightweight material;

b. means for placing said base over the fingers and thumb of a user's hand, comprising an elongated finger slot through which a plurality of fingers is inserted, and an opposing, proportionately smaller thumb hole through which a thumb is inserted;

c. means for protecting the palm area of a user's hand, comprising that portion of said base which surrounds and separates said finger slot and said thumb hole;

d. said base being reversible, meaning that it can be held in a left hand or a right hand without modifying the structure;

whereby, when the hand-held device is placed over the fingers and thumb of a user's hand, said base comes to rest above the palm area of said hand, allowing said fingers and thumb to remain unrestrained and able to pick up and hold a bagel or the like between them on top of said base, while an opposite hand utilizing a knife slices completely through a bagel or the like down to said base, said base preventing the knife from cutting and injuring the hand of said user.

2. The device of claim 1, such that said thumb hole is positioned approximately 2 inches away from an upper region of said elongated finger slot.

3. The device of claim 1, such that said base is approximately 5½ inches across.

* * * * *